United States Patent [19]

Cullen et al.

[11] Patent Number: 4,457,843
[45] Date of Patent: Jul. 3, 1984

[54] SELF-RETAINING ADSORBENT CONTAINER

[75] Inventors: John S. Cullen, Buffalo; Samuel A. Incorvia; James A. Vogt, both of Tonawanda, all of N.Y.

[73] Assignee: Multiform Desiccants, Inc., Buffalo, N.Y.

[21] Appl. No.: 377,385

[22] Filed: May 12, 1982

[51] Int. Cl.³ .................. B01D 15/00; B01D 53/04
[52] U.S. Cl. ..................... 210/282; 55/387; 210/DIG. 6
[58] Field of Search ............ 55/387, 389; 210/282, 210/287–289, 484, 497.01, 502, DIG. 6; 62/503

[56] References Cited

U.S. PATENT DOCUMENTS

| | | | |
|---|---|---|---|
| 2,770,317 | 11/1956 | Bottum | 210/282 |
| 3,734,296 | 5/1973 | Proctor et al. | 210/288 |
| 3,799,352 | 3/1974 | McClive | 210/282 |
| 4,111,005 | 9/1978 | Livesay | 62/503 |
| 4,116,649 | 9/1978 | Cullen et al. | 55/387 |
| 4,187,695 | 2/1980 | Schumacher | 62/503 |
| 4,199,960 | 4/1980 | Adams et al. | 62/503 |
| 4,276,756 | 7/1981 | Livesay | 62/503 |
| 4,291,548 | 9/1981 | Livesay | 62/503 |

Primary Examiner—Ivars C. Cintins
Attorney, Agent, or Firm—Joseph P. Gastel

[57] ABSTRACT

A self-retaining adsorbent container including a cylindrical cup-shaped casing of porous material, adsorbent in the casing, a porous end wall secured to the edge of the cup-shaped casing at its open end by a rim which is more rigid than the material of the cup-shaped casing, and diametrically spaced concave indentations in the casing and the cover for receiving spaced pipes in a refrigerant receiver.

14 Claims, 9 Drawing Figures

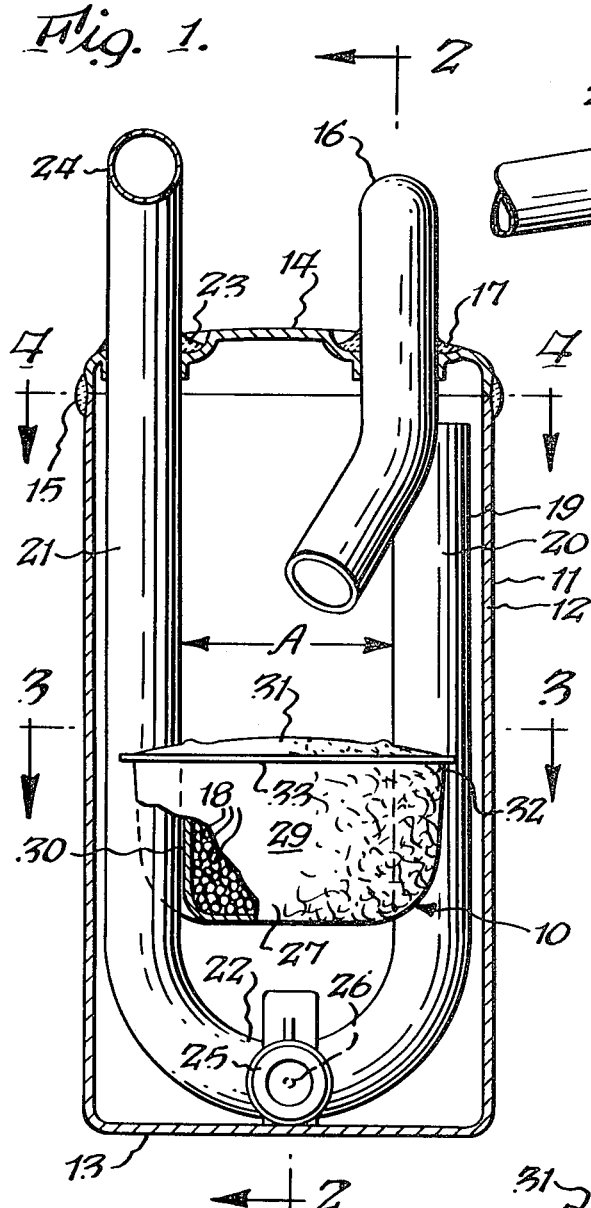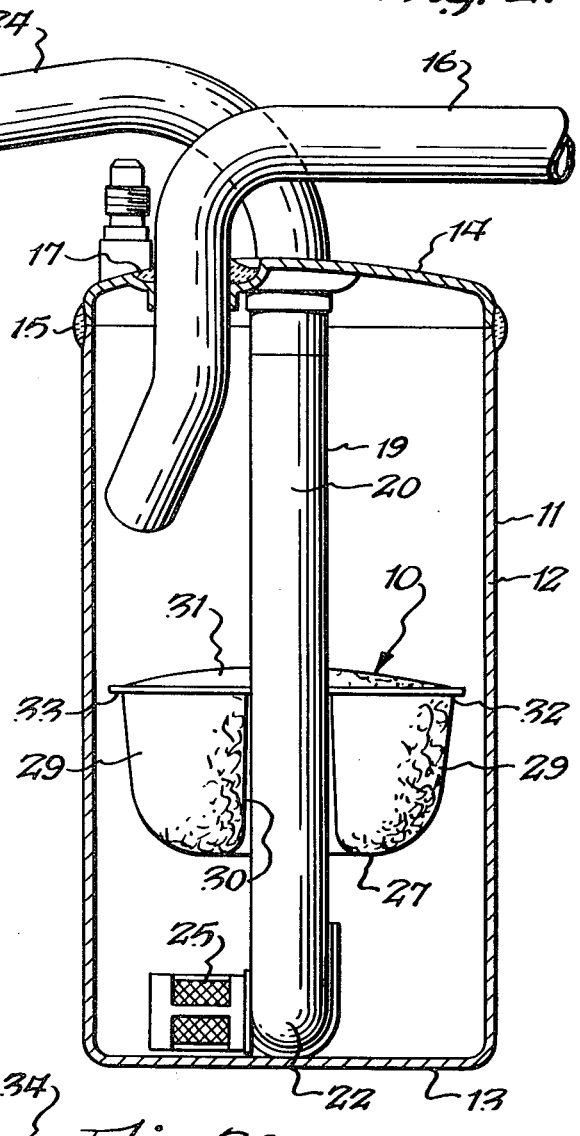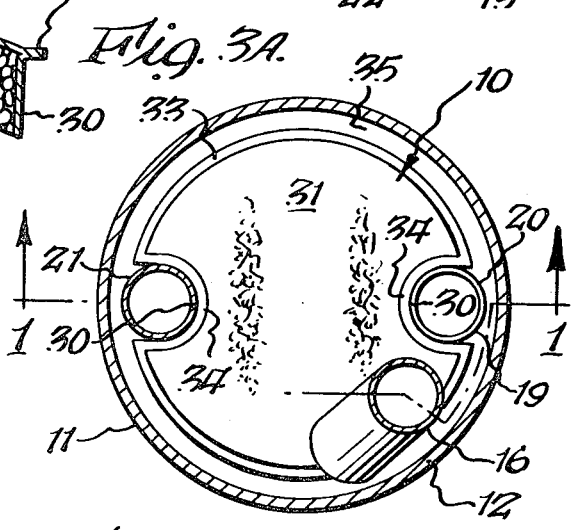

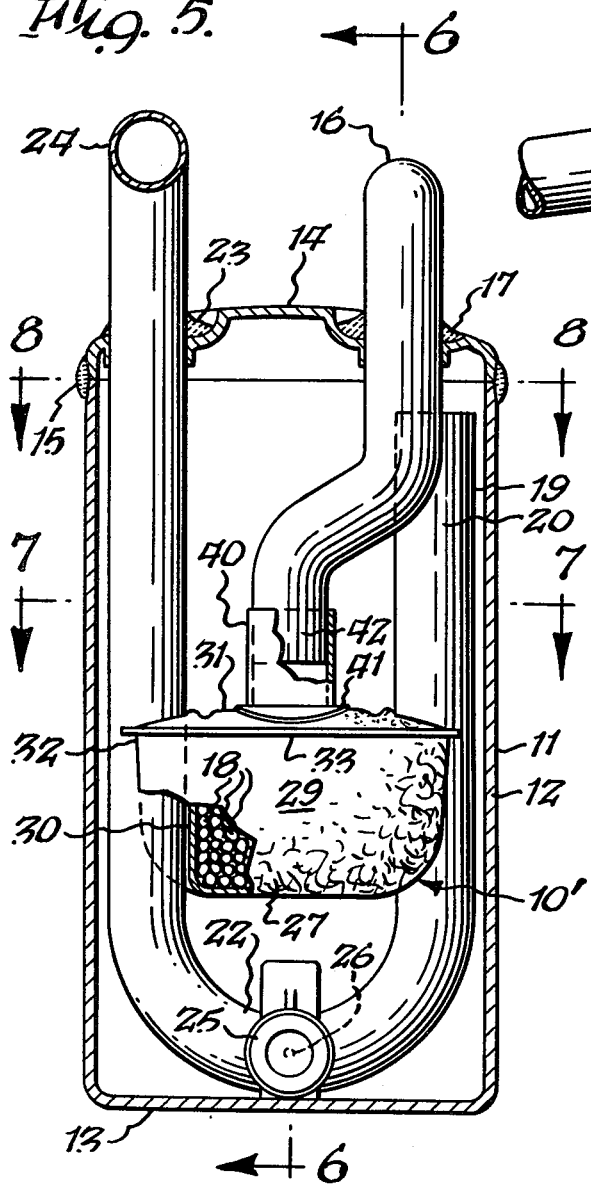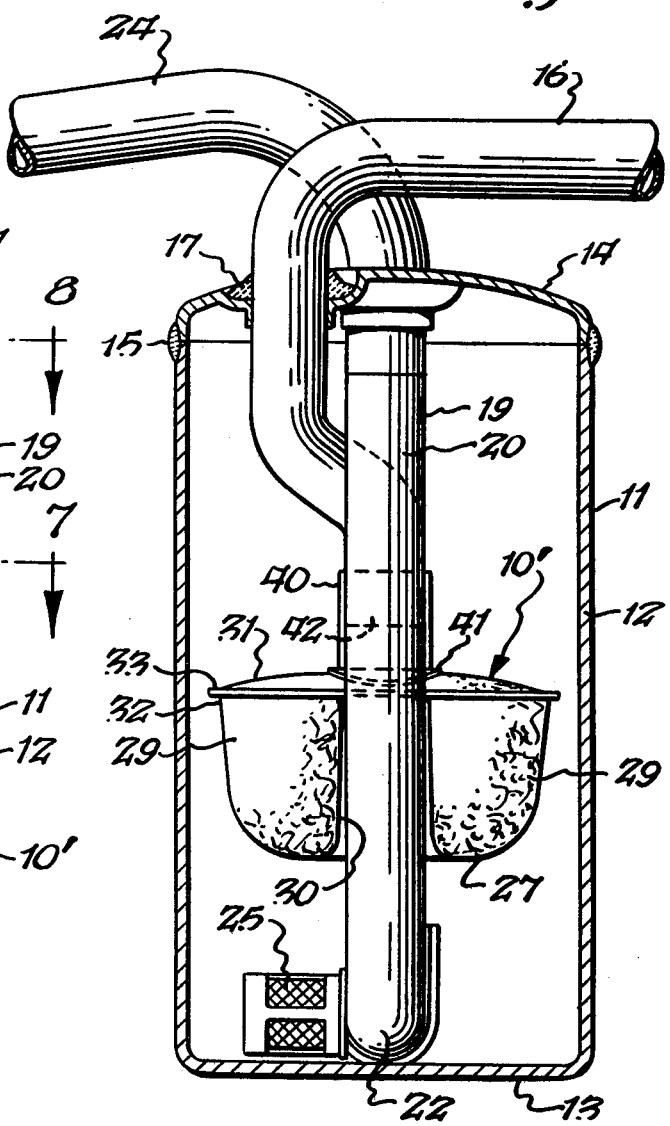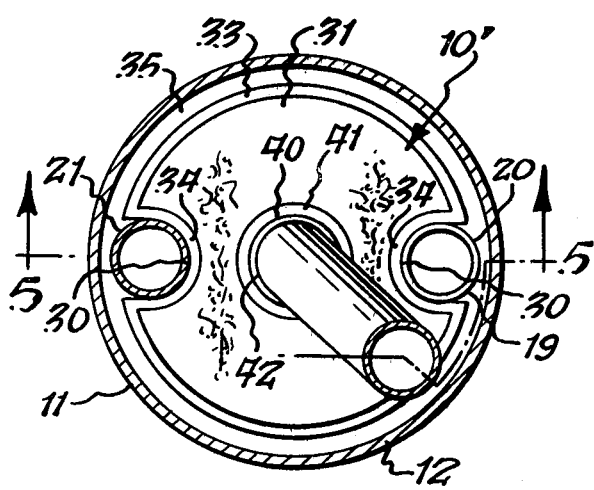

SELF-RETAINING ADSORBENT CONTAINER

BACKGROUND OF THE INVENTION

The present invention relates to an improved adsorbent container having a specialized configuration which is utilized to mount it in position in its operational environment.

By way of background, it is common practice to place an adsorbent container in the receiver of an automotive air conditioning system to adsorb undesirable substances from the refrigerant. In the past the container was fixed in position by the use of a flap or a harness attached thereto, which was also secured to a pipe in the refrigerant receiver. The use of a flap not only increased the cost of fabrication, but required additional labor to mount the flap on a pipe. It is with providing an improved adsorbent container which obviates the foregoing deficiencies that the present invention is concerned.

SUMMARY OF THE INVENTION

It is accordingly one object of the present invention to provide an improved adsorbent container which is formed of a predetermined configuration so that it can be mounted relative to refrigerant pipes in a receiver in an extremely simple and expedient manner.

Another object of the present invention is to provide an improved adsorbent container for a refrigerant receiver, which is maintained in operative position in the receiver without the use of flaps or other appendages.

A further object of the present invention is to provide an improved adsorbent container for a refrigerant receiver, which is positioned in spaced relationship to the receiver wall incidental to mounting it in its operative relationship, thereby obviating the possibility of damage to the adsorbent container from the heating of the receiver wall when its top is welded thereto. Other objects and attendant advantages of the present invention will readily be perceived hereafter.

The present invention relates to a self-retaining adsorbent container comprising a porous casing including an outer wall, adsorbent in said casing, and a plurality of circumferentially spaced concave indentations in said outer wall for mounting said adsorbent container in its operating environment.

The various aspects of the present invention will be more fully understood when the following portions of the specification are read in conjunction with the accompanying drawings wherein:

BRIEF DESCRIPTION OF THE DRAWINGS

FIG. 1 is a cross sectional view taken substantially along line 1—1 of FIG. 4 and showing the improved adsorbent container of the present invention mounted on refrigerant pipes within a refrigerant receiver of a automotive air conditioning system;

FIG. 2 is a fragmentary cross sectional view taken substantially along line 2—2 of FIG. 1;

FIG. 3 is a cross sectional view taken substantially along line 3—3 of FIG. 1;

FIG. 3A is a fragmentary cross sectional view taken substantially along line 3A—3A of FIG. 3;

FIG. 4 is a cross sectional view taken substantially along line 4—4 of FIG. 1;

FIG. 5 is a cross sectional view taken substantially along line 5—5 of FIG. 8 and showing a modified form of the adsorbent container of the present invention mounted within a modified form of refrigerant receiver;

FIG. 6 is a fragmentary cross sectional view taken substantially along line 6—6 of FIG. 5;

FIG. 7 is a cross sectional view taken substantially along line 7—7 of FIG. 5; and FIG. 8 is a cross sectional view taken substantially along line 8—8 of FIG. 5.

DESCRIPTION OF THE PREFERRED EMBODIMENTS

The improved adsorbent container 10 is shown in mounted relationship within refrigerant receiver or accumulator 11 of an automotive air conditioning system. As is well understood, but not shown in the drawings, the air conditioning system includes a compressor, the output of which is conducted to a condenser and then to an expansion valve and then to an evaporator and then to accumulator 11 and then back to the compressor. An air conditioning system of this type is shown in U.S. Pat. No. 4,291,548, which is incorporated herein by reference.

Accumulator or receiver 11 includes a cylindrical wall 12, a bottom wall 13 and a top wall 14 which is secured to wall 12 by means of welded seam 15. Conduit 16 is mounted in sealed relationship with cover 14 at 17 and conducts a mixture of liquid and gaseous refrigerant to receiver 11 from the evaporator. Mounted within receiver 11 is U-shaped pipe 19 having parallel portions 20 and 21 connected by bottom bend 22. The upper portion of pipe portion 21 is mounted in sealed relationship with cover 14 at 23, and portion 24 of pipe 19 leads to the air conditioning compressor. The top of pipe portion 20 is open to receive gaseous refrigerant. As is conventional in the art, a filter 25 is mounted on U-shaped pipe portion 22 and is in communication with an aperture 26 in pipe portion 22 to filter liquid, such as oil, entering pipe 19.

The improved adsorbent container 10 of the present invention is of the self retaining type and is mounted on and spans pipe portions 20 and 21. Adsorbent container 10 includes a cup-shaped casing 27 which has a porous substantially cylindrical wall 29. Casing 27 is formed of one piece of material by a suitable pressing operation from planar sheet material and it contains suitable adsorbent 18 in granular form. Concavities 30 in cup-shaped portion 27 receive pipe portions 20 and 21 in substantially complementary mating relationship. A porous end wall 31, which is slightly rounded as shown, is secured to the upper edge portion 32 of cup-shaped casing 27 by means of an electrostitched seam which produces a rim 33 which projects outwardly about 1/16" beyond the outer periphery of the cup-shaped casing 27 for the entire 360° of its extent. Cup-shaped casing 27 and end wall 31 are fabricated from plastic, preferably polyester. However, a variety of other felted and spun-bonded textiles can be used. The electrostitched rim 33 is formed by fusion of the adjacent parts at the junction. Because rim 33 is fused polyester, it is relatively stiff, and this stiffness aids in maintaining the adsorbent unit 10 in its desired position on pipe portions 20 and 21, notwithstanding that the remainder of the adsorbent unit 10 is soft and relatively flexible.

In a preferred embodiment of the invention the distance A (FIG. 1) between pipe portions 20 and 21 was 1.860 inches. The distance B between rim portions 34 was 1.920 inches with the end wall 31 in a relaxed condition. The outer diameter of pipe portions 20 and 21 was 0.625 inches. The diameter of concave indented rim portions 34 was about 0.625 inches. It can therefore be seen that there is a frictional engagement between rim portions 34 and pipe portions 20 and 21 because distance A (FIG. 1) is less than distance B and therefore the end wall 31 tends to exert an outward force on pipe portions 20 and 21.

In addition to the foregoing, it can be seen from FIGS. 3 and 4 that there is an annular peripheral space 35 between the inside of receiver wall 12 and the outer periphery of rim 33. Thus, the mounting arrangement for adsorbent container 10 causes all portions of the adsorbent container to be spaced from wall 12 and thus it will not in any way be affected by the heating of wall 12 when cover 14 is welded thereto.

It will be appreciated that the installation of adsorbent container 10 to its operating position within receiver 11 is an extremely simple task inasmuch as there are no flaps or other parts which are to be utilized in securing container 10 in position. All that is required is to install container 10 in position on pipe portions 20 and 21 so that the concave indentations 30 receive such pipe portions. The adsorbent container 10 can be slid to any desired position.

In FIGS. 5-8 a modified embodiment of the present invention is shown. The difference between adsorbent container 10 of FIGS. 1-4 and adsorbent container 10' is that the latter includes a tubular cylindrical conduit 40 secured to the center of end wall 31 at annular rim 41 by means of electrostitching or any other suitable operation. The fusion can be achieved because both tubular member 40 and the end wall of the container are fabricated from polyester. The inlet conduit 42, which conducts refrigerant from the evaporator, fits into tubular member 40 with a friction fit so that the adsorbent container 10' is secured to the lower end of refrigerant conduit 42 as well as between refrigerant pipes 20 and 21 in the manner described above in detail in FIGS. 1-4. This construction causes the refrigerant from pipe 42 to be forced through adsorbent container 10'. However, if desired, apertures (not shown) may be provided in conduit 40 beyond the end of pipe 42 therein, so that some of the refrigerant may pass out of conduit 40 and flow across end wall 31. This will insure that there is no back pressure on the evaporator.

Except for the above discussed structure, the embodiment of FIGS. 5-8 is identical to the embodiment of FIGS. 1-4 and accordingly corresponding elements of structure are designated by identical numerals, and it is therefore believed unnecessary to repeat the description of such structure.

The material from which adsorbent containers 10 and 10' are made is preferably a thermoplastic sheet material, such as felted polyester which can have the edges fused to provide the rim 33. By way of example and not limitation, a felted polyester which has been used is between 0.065 and 0.097 inches thick and has a weight of about 9 ounces per square yard. It will be appreciated that other polyesters of different thickness and of other types of construction, such as spun-bonded, may be used. It will also be appreciated that containers 10 and 10' may be made out of any other suitable material which is porous. Such materials may be plastic or natural fibers. While end wall 31 was attached to casing 27 by electrostitching, it will be appreciated that they may be joined by any other type of fusion, gluing, stitching or in any other suitable manner. The adsorbent 18 in containers 10 and 10' may selectively include, without limitation, adsorbents such as silica gel, metal alumino silicate, alumina, calcium sulfate, activated charcoal, molecular sieve, or any other desired compound in bead, pellet or granular form. However, for the present application in an automotive air conditioner, the molecular sieve is preferred.

While the drawings show adsorbent containers 10 and 10' held at an intermediate point between the top and bottom of U-shaped conduit 19, it will be appreciated that the containers would probably eventually settle toward the bottom. If desired, the containers can be dimensioned so as to fit with an extremely tight frictional fit so as to remain at a predetermined elevation.

While preferred embodiments of the present invention have been disclosed, it will be appreciated that the present invention is not limited thereto, but may be otherwise embodied within the scope of the following claims.

What is claimed is:

1. In a refrigerant receiver having spaced substantially parallel refrigerant pipes, an adsorbent container comprising a porous casing having a porous outer wall and a porous end wall, adsorbent in said porous casing, a plurality of substantially concave indentations in said porous outer wall, said concave indentations being spaced from each other a distance to receive said substantially parallel refrigerant pipes therein so as to permit said casing to be slid axially of said refrigerant pipes.

2. In a vessel having spaced pipe portions therein, an adsorbent container comprising a porous casing having a porous outer wall and an end wall, adsorbent in said porous casing, concave indentation means in said porous outer wall for receiving said spaced pipe portions to mount said adsorbent container within said vessel, a relatively stiff rim joining said porous outer wall and said end wall, and second concave indentation means in said relatively stiff rim in alignment with said concave indentation means, said second concave indentation means being dimensioned to frictionally engage said spaced pipe portions.

3. In a vessel having spaced pipe portions therein, an adsorbent container comprising a porous casing having a porous outer wall and an end wall, adsorbent in said porous casing, concave indentation means in said porous outer wall for receiving said spaced pipe portions to mount said adsorbent container within said vessel, another pipe portion in said vessel, an open end on said another pipe portion, and a conduit secured to said end wall and including a portion located outside of said casing for mounting on said open end to thereby conduct fluid into said casing from said another pipe portion.

4. In a vessel as set forth in claim 3 wherein said porous outer wall is part of a cup-shaped member having a second open end, and wherein said end wall is secured to said cup-shaped member to close said second open end.

5. In a vessel as set forth in claim 4 wherein said cup-shaped member includes an edge at said open end, and wherein said end wall is secured to said edge.

6. In a vessel as set forth in claim 5 wherein said end wall includes an outer edge, and wherein said outer edge is secured to said edge of said cup-shaped member by fusion to produce a relatively stiff peripheral rim portion for rigidizing said casing.

7. In a vessel as set forth in claim 6 wherein said relatively stiff peripheral rim portion includes second concave indentation means in alignment with said concave indentations in said outer wall.

8. In a vessel as set forth in claim 7 wherein said concave indentation means comprise two indentations located in diametrically opposed relationship.

9. In a vessel having a cylindrical wall of a first diameter and having spaced pipe portions therein, an adsorbent container comprising a porous casing having a porous outer wall and an end wall, adsorbent in said porous casing, concave indentation means in said porous outer wall for receiving said spaced pipe portions to mount said adsorbent container within said vessel, said porous outer wall of said casing being substantially cylindrical and of a second diameter which is less than said first diameter, and said spaced pipe portions being oriented within said cylindrical wall of said vessel so as to mount said adsorbent container in non-touching spaced relationship to said cylindrical wall.

10. In a vessel having spaced pipe portions therein, an adsorbent container comprising a porous casing having a porous outer wall and an end wall, adsorbent in said porous casing, concave indentation means in said porous outer wall for receiving said spaced pipe portions to mount said adsorbent container within said vessel, said concave indentation means comprising two indentations on opposite portions of said porous outer wall, a relatively stiff rim on said casing joining said porous outer wall and said end wall, and second concave indentation means in said relatively stiff rim in alignment with said concave indentation means, whereby said relatively stiff rim resists movement of said porous casing crosswise of said pipe portions.

11. In a vessel as set forth in claim 10 wherein said porous outer wall is part of a cup-shaped member.

12. In a vessel having spaced pipe portions therein, an adsorbent container comprising a porous casing having a porous outer wall and an end wall, adsorbent in said porous casing, concave indentation means in said porous outer wall for receiving said spaced pipe portions to mount said adsorbent container within said vessel, said porous outer wall and said end wall being fabricated of plastic, and a rim comprising the fused junction of said porous outer wall and said end wall.

13. In a vessel having an outer wall and spaced pipe portions therein, an adsorbent container comprising a porous casing having a porous outer wall and an end wall, adsorbent in said porous casing, and concave indentation means in said porous outer wall for receiving said spaced pipe portions to mount said adsorbent container within said vessel, said adsorbent container having a dimension which is smaller than the space defined by said outer wall, and wherein said spaced pipe portions are oriented within said outer wall so as to mount said adsorbent container in non-touching spaced relationship to said outer wall.

14. In a vessel as set forth in claim 13 and wherein said concave indentation means comprise two indentations on opposite portions of said porous casing.

* * * * *